Vincent N. DiGiambattista
INVENTOR.

Vincent N. DiGiambattista
INVENTOR.

Vincent N. DiGiambattista
INVENTOR.

Vincent N. DiGiambattista
INVENTOR.

United States Patent Office 3,434,669
Patented Mar. 25, 1969

3,434,669
APPARATUS AND PROCESS FOR PRODUCING POWDERED METAL FROM DUCTILE ELEMENTAL METAL OR ALLOYS THEREOF
Vincent N. Di Giambattista, Trafford, Pa., assignor to Penn Nuclear Corporation, a corporation of Pennsylvania
Filed Dec. 29, 1965, Ser. No. 517,296
Int. Cl. B02c *21/00, 19/00;* B07b *13/04*
U.S. Cl. 241—16      7 Claims

ABSTRACT OF THE DISCLOSURE

An apparatus and process for the attrition of ductible metals such as to produce finely divided metal powder which conforms to the rigid chemical and physical parameters required for the production of metallic components by powder metallurgy techniques. The apparatus provides a means of cleansing chips of the material to be reduced to powder, and attrition means for impacting the chips against one another to reduce them to the desired particle size, which apparatus includes means for maintaining a force flow of inert gas through the attriton zone, which gas is preferably refrigerated. The attrited metal is then hermetically packaged while still in an inert atmosphere so as to substantially preclude contamination of the metal powder by interstitial contaminants.

---

This invention relates to apparatus and a process for comminuting ductile metals or ductile metal alloys to produce a finely powered metal characterized by the absence of any significant portion of gaseous or solid contaminants which may be detrimental to the subsequent utilization of the powdered metal produced. More specifically, this invention relates to apparatus for and a process of producing powdered zirconium alloys, for example, which must conform to certain rigid specifications such as with regard to their chemistry, corrosion characteristics, tensile strength, flow rate density, etc., in order to produce a suitable metallic powder which may be utilized in the fabrication of nuclear reactor chambers, tubings, and the like due to the fact that when substantially free of hafnium and other certain contaminants, zirconium is highly corrosion-resistant and has a low absorption for neutrons.

Due to the ductile nature of metals such as zirconium, beryllium, copper, lead, gold, silver, and the like, considerable difficulty has been experienced heretofore in attempting to convert such metals or alloys thereof into finely comminuted powders which are suitable for utilization in the casting or forging of various components from the powdered metal.

Due to the physical and chemical parameters established for such metal powder mechanically attrited metal powders such as zircaloy powder is generally produced from billets conforming to the physical and chemical parameters which must then be further processed in such a manner so as to preclude contamination of the material. The aforementioned billets are reduced to relatively fine chips by milling for example, which chips are subsequently reduced to powder. In addition, the scrap material generated from the fabrication of various components utilizing alloys which conform to the required physical and chemical parameters have not been salvagable heretofore because, the chips and trimmings are generally too heavy to be comminuted or attrited by standard procedures as well as the fact that, the chips are sometimes contaminated with iron or steel trimmings as well as other foreign contaminants, accordingly making it difficult if not impossible to produce a metal powder such as a zirconium alloy metal powder, to conform to the physical and chemical parameters required.

Accordingly, it is a primary object of this invention to provide apparatus and a process for the attrition of ductile metals such as zircaloy metal to produce a finely comminuted metal powder which conforms to the rigid chemical and physical parameters required for the production of a reactor grade zircaloy metal powder.

Another object of this invention is to provide apparatus and a process for the production of finely comminuted metal powder from ductile metals such as beryllium, copper, lead, gold, silver or the like and alloys thereof.

A further object of this invention is to provide apparatus for the comminution of a ductile metal, or metal alloy whereby the comminuting of the metal is carried out in a controlled relatively inert atmosphere so as to substantially preclude the contamination of the metal powder being produced by gaseous or other contaminants which might otherwise be retained upon the surfaces of or within the interstices between the finely comminuted particles of metal or metal alloy.

Still a further object of this invention is to provide a suitable apparatus for the production of finely comminuted metal powders produced from relatively ductile metals or metal alloys by maintaining the material being comminuted in a substantially fluidized-solid state to preclude any significant amount of galling, or cohesion, of the individual particles thereby assuring the production of a metal powder characterized by a high degree of uniformity with regard to average particle size.

Still another object of this invention is to provide an improved comminuting mill which may be utilized to finely comminute ductile metals, or ductile metal alloys without causing galling of the material being comminuted thus assuring that the attritioning mill will not seize up and stall and at the same time maintaining the power requirements for the comminuting mill within reasonable acceptable limits.

A still further object of this invention is to provide a suitable apparatus for the comminution of ductile metals, or ductile metal alloys wherein the entire process of comminuting the metal is carried on in a substantially inert atmosphere wherein the apparatus is provided with a means to remove the heat produced by the mechanical attritioning of the metal to produce the finely comminuted metal powder.

These together with other objects and advantages which will become subsequently apparent reside in the details of construction, operation, and method as more fully hereinafter described and claimed, references being had to the accompanying drawings forming a part thereof, wherein like numerals refer to like parts throughout, and in which:

Figure 1:
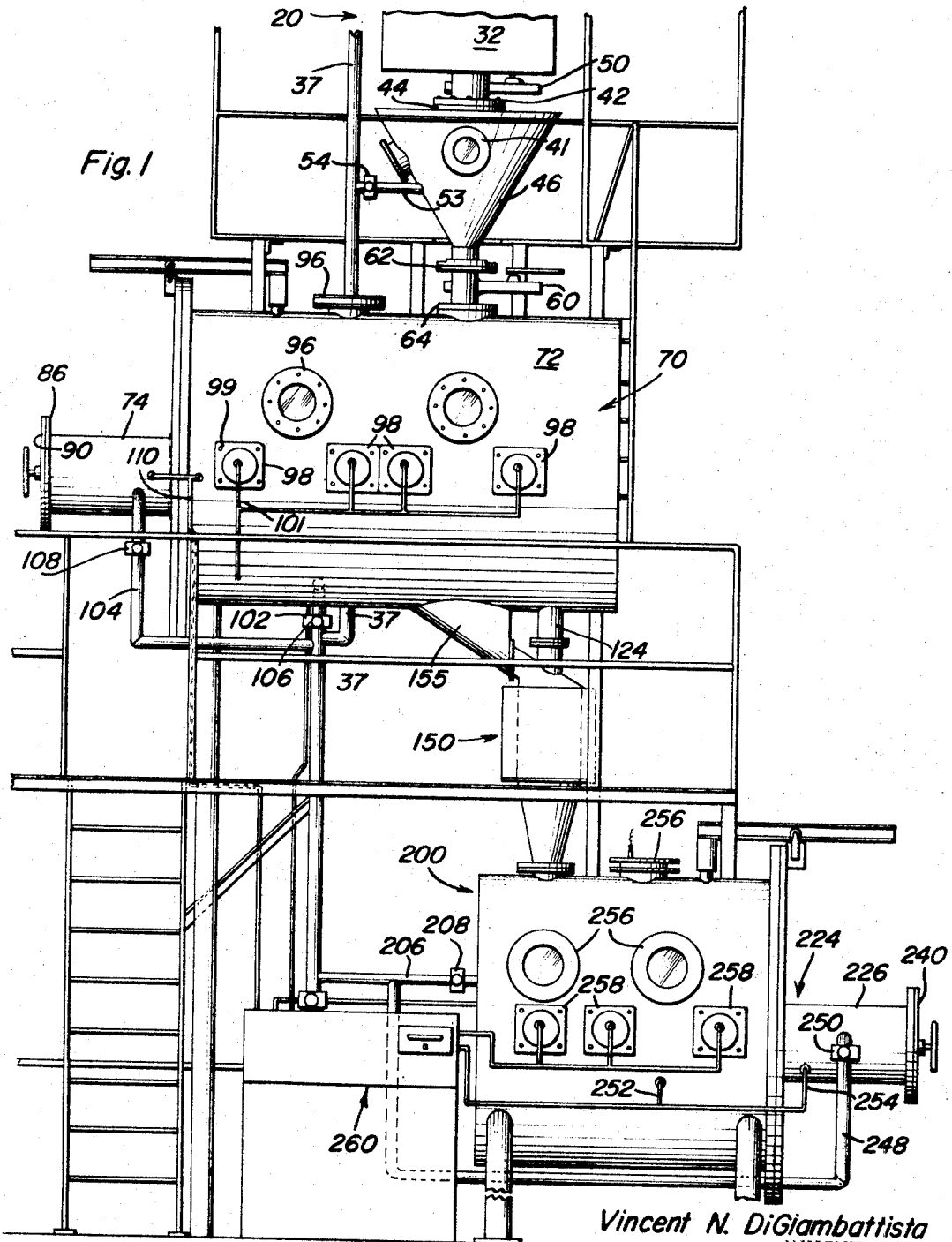
FIGURE 1 is an elevational view of substantially the entire apparatus utilized in the practice of the present invention.
Figure 2:
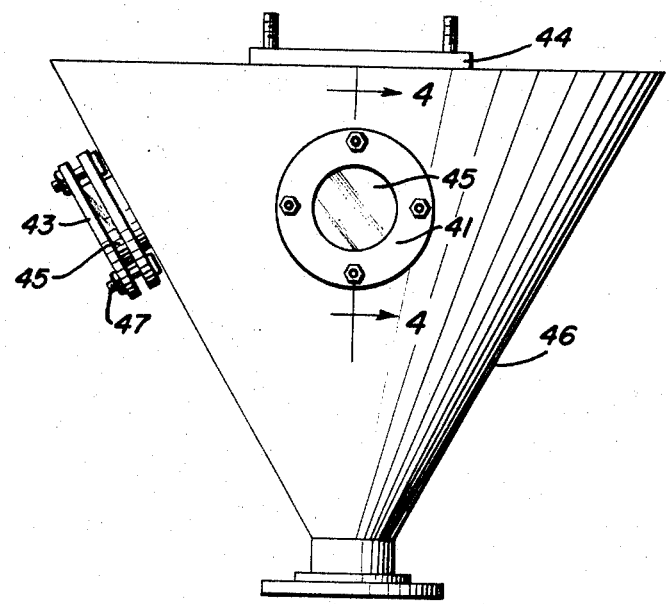
FIGURE 2 is a side elevational view of a component comprising a conical hopper provided adjacent the top of the apparatus of FIGURE 1.
Figure 3:
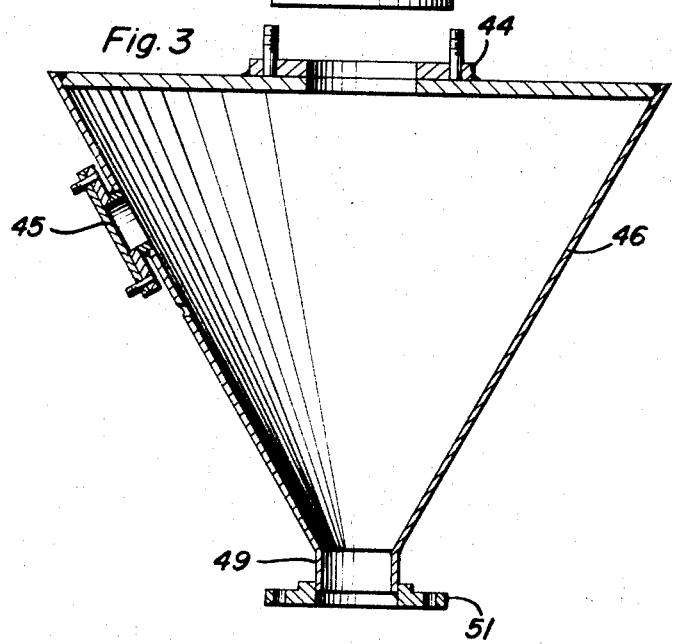
FIGURE 3 is a vertical sectional view taken generally along the vertical median of the hopper.
Figure 4:
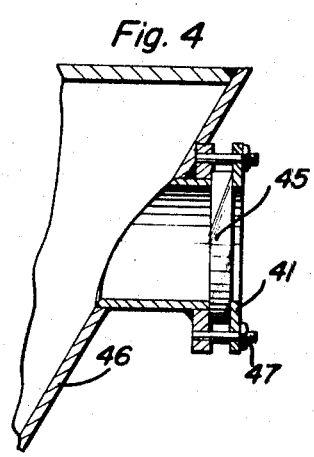
FIGURE 4 is a fragmentary enlarged vertical sectional view of a portion of the hopper of FIGURE 2 taken substantially along the plane of the line 4—4 of FIGURE 2.

Referring now to the drawings and FIGURE 1 in particular there is illustrated an apparatus for the production of finely comminuted metal powder from relatively coarse particulate metal chips or the like, which are to be comminuted to produce a metal powder of approximately 200 mesh Tyler Standard.

Although the apparatus is not shown, the preparation of suitable chips from metal billets, or scrap material for introduction into the apparatus of the present invention comprises a step in the practice of this invention and accordingly will be described. In fact, preparation of the material to be comminuted is a critical step in the method of producing a suitable reactor grade zirconium alloy metal powder for example. However, inasmuch as this step in my novel process utilizes conventional equipment it is not considered necessary to illustrate the same.

The preparation and cleaning of suitable chips and/or trimmings prior to comminuting or attritioning involves placing the chips in a suitable receptacle after which they are flushed with cold water for a sufficient length of time to float away a major portion of the surface contaminants. The chips are then preferably transferred into a stainless steel perforated basket or the like, which is then submerged in a suitable degreasing device which utilizes an organic solvent such as toluene for example, to remove a substantial portion of the organic material adhering to the chips.

After being subjected to the organic solvent for a sufficient length of time the perforated basket containing the degreased chips is permitted to drain and then is transferred to a washing tank preferably containing a non-boronated, non-sulfonated detergent and is subject to the action of the detergent for a period of time sufficient to remove the remainder of the readily removable contaminants adhering to the surface of the chips. The chips are then rinsed with clear water. They are then drained and transferred to an etching tank preferably fabricated from stainless steel where they are subjected to rinsing by a nitric acid solution, or the like, to insure the complete removal of metallic impurities which may have impinged on the chips. The chips are then transferred to a water rinse tank which is designed for constant flushing to insure complete removal of any residual film. The chips are then transferred to a stainless steel drum drier and are tumbled until all surface moisture is removed at which time they are removed and charged into a vacuum drying oven which comprises the inlet point for the novel apparatus of my invention.

Briefly, in the practice of my invention novel apparatus is provided for vacuum drying the previously washed metallic chips which are dried and then comminuted, classified and hermetically packaged within an apparatus which has been substantially evacuated and back filled to a slightly higher pressure than that surrounding the atmosphere, with a suitable inert gas such as ultra pure helium.

In the following discussion the process will be described in particular regard to the production of reactor grade zirconium alloy powder which satisfies the chemical and physical parameters established for such material. It will be understood, of course, that the apparatus and process of the present invention is suitable for the production of high purity metal powder from other ductile metals or alloys of such as set forth supra.

Figure 9:
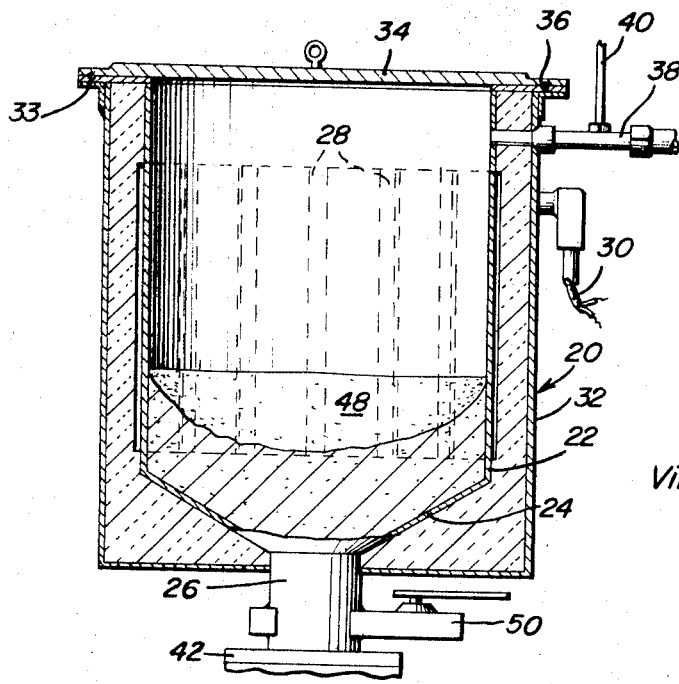
FIGURE 9 is an enlarged vertical sectional view of the uppermost position of the apparatus of FIGURE 1 (wherein only a fragmentary portion of the device of FIGURE 9 may be seen).

Referring to FIGURES 1 and 9 a vacuum drying oven is indicated generally at 20. The drying oven 20, which is the charging point for the material to be comminuted, is a generally cylindrical double walled vessel provided with a stainless steel liner 22 which is provided with a downwardly and inwardly converging lower portion 24 which is in turn integral with an outlet pipe 26. A plurality of electrical "strip" heating elements 28 are fixedly secured to the exterior of the stainless steel liner 22 in a uniform pattern thereabout, extending along substantially the entire height of the vertical portion of the liner 22. The heating elements 28 are connected to a suitably controlled source of operating current by means of the conductors 30. The liner 22 and heating elements 28 are encased in a suitable thermal insulator such as glass fiber for example. The vacuum drying oven 20 is further provided with an exterior shell 32, and a cover plate 34 which is in turn provided with a sealing O-ring 36 which is received in a suitable groove provided on the upper axial face of the flange 33 secured about the upper periphery of the exterior shell 32. The cover 34 may be sealingly secured to the flange 33 by a plurality of bolts or other suitable fastening means, not shown, about the outer periphery of the cover 34.

The vacuum drying oven 20 is further provided with a vacuum line 38 connected to a main vacuum line 37 which is in turn connected to a suitable source of vacuum such as a vane type vacuum pump, not shown, which is utilized to evacuate all the various components comprising the apparatus illustrated in FIGURE 1. A conduit 40 connected to a suitable source of ultra pure helium gas under pressure is provided to permit back filling of the vacuum oven 20 with an inert gas subsequent to the evacuation of the air therefrom. As will become apparent, the entire system is preferably back filled with helium to a pressure slightly in excess of the ambient pressure surrounding the processing equipment thereby assuring that if a minute leak develops in the equipment the passage of fluid will be from the interior of the vessel outward thereby further precluding the contamination of the material being processed by gaseous or particulate contaminants carried by the gas which would otherwise pass from the outside into the processing equipment.

The outlet 26 of the drying oven 20 is provided with a coupling flange 42 which is rigidly and sealingly secured to a complementary flange 44 of a downwardly converging hopper 46. The gravity feed of metal chips indicated generally at 48, from the drying oven 20 into the hopper 46 is controlled by a vacuum means 50 which is preferably a vacuum valve of the sliding gate type.

The conical hopper 46 provides an intermediate holding point for degreased, dried chips which are to be fed into the comminuting apparatus. As seen best in FIGURES 1 through 4, the conical hopper 46 may be provided with a plurality of access or inspection ports such as a sight port 41 and a port 43 which may be utilized to illuminate the interior of the hopper 46 with an external light, not shown. The ports 41 and 43 are provided with respective shatter-resistant glass lenses 45 which are sealingly clamped to the respective flanges on the hopper 46 by means of compression plates held in place by a plurality of threaded fasteners or the like such as 47 for example. The lower portion of the conical hopper 46 terminates in an integral hopper outlet tube 49 which is provided with an integral coupling flange 51. The gas within the interior of the conical hopper 46 may be evacuated by virtue of the vacuum line 53 which is connected to the main vacuum line 37. A suitable on-off valve 54 is interposed in the vacuum line 53 to control the evacuation of the hopper 46.

A sliding gate type vacuum valve means 60 which is provided with a pair of coupling flanges 62 and 64 is interposed between the conical hopper 46 and a comminuting chamber means indicated generally at 70. The valve means 60 is sealingly secured to the flange 51 of the hopper 46 by means of a plurality of threaded fasteners or the like, not shown.

Figure 7:
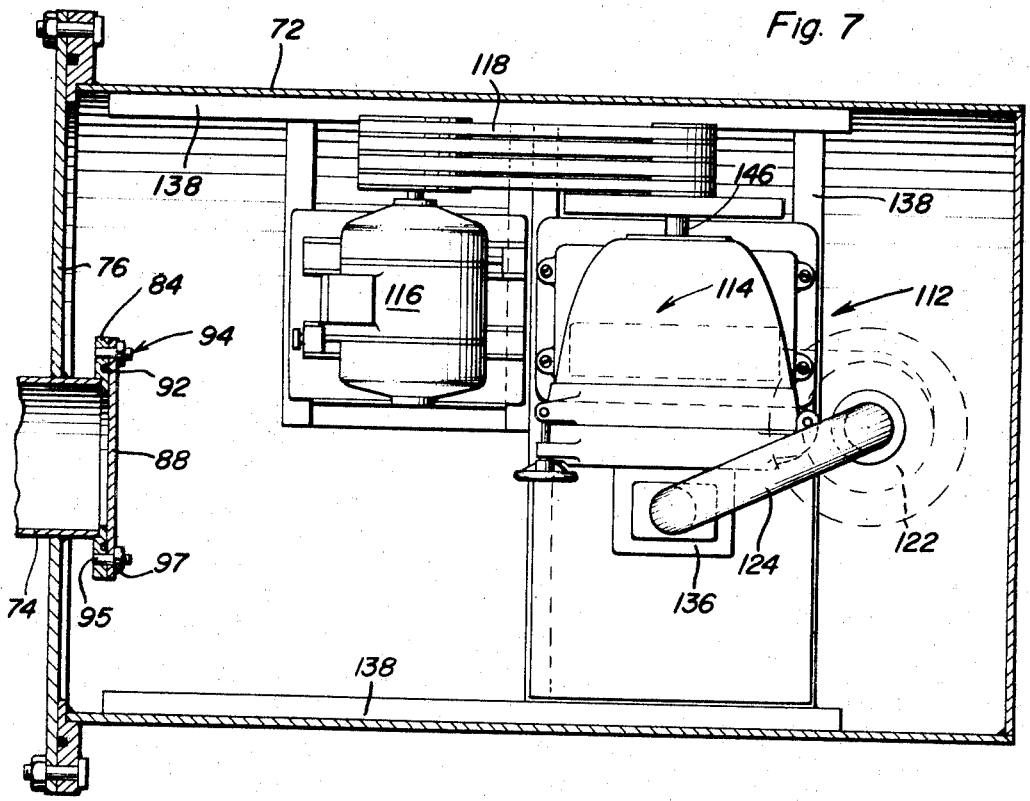
FIGURE 7 is a horizontal sectional view of the device of FIGURE 5 further showing certain interior details in top plan.

The comminuting chamber means 70 includes a generally cylindrical pressure vessel 72 and a comminuting chamber access interlock means 74 to permit the introduction of material into or the removal of material from the interior of the pressure vessel 72 without adversely effecting the atmosphere within the pressure vessel 72. The comminuting chamber access interlock 74 is sealingly and rigidly secured in a suitable aperture provided in a cover plate 76 sealingly secured to a flange 78 carried by the pressure vessel 72 as seen best in FIGURES 5 and 7. The flange 78 is provided with a suitable groove 80 in the axially extending outward surface thereof for the reception of an O-ring seal 82 formed of a suitable resilient material such as neoprene for example. The cover plate 76 is sealingly secured to the flange 78 by means of a plurality of threaded fasteners situated in the outer periphery of the plate 76 and the flange 78.

The comminuting chamber access interlock 74 is provided with an inner and outer flange 84 and 86 respectively, to which are sealingly clamped respective closure plates 88 and 90. The respective flanges 84 and 86 are provided with O-ring seal members, one of which is shown at 92. The respective closure plates 90 and 88 are retained in position by a plurality of threaded fasteners or the like, such as shown at 94, which are received in suitable apertures. As seen best in FIGURE 7 the threaded fasteners 94 includes studs 95 threadably or otherwise retained in flanges 84 and 86, and nuts 97 which are threadably received on the outwardly projecting threaded portion of stud 95.

The comminuting chamber pressure vessel 72 may further be provided with a plurality of sight ports 96, which are similar in construction to the ports 41 and 43 provided on the conical hopper 46.

As seen best in FIGURE 1, the comminuting chamber pressure vessel 72 is further provided with a plurality of glove ports 98 to permit manipulation of various components within the vessel 72 without disturbing the atmosphere therein. Although not illustrated, the glove ports 98 are of a conventional construction wherein a fluid impervious rubber glove is sealingly secured to an outwardly projecting boss in the side of the pressure vessel 72 with the gloves extending inwardly thereof. When the glove ports are not in use they are covered with plates 99 which are provided with a conduit 101 connected to a suitable source of vacuum or pressure to permit equalization of the pressure within the unused glove and the interior of the vessel 72 thereby precluding the distention and rupturing of the gloves by equalizing the pressure between the interior of the glove and the interior of the pressure vessel 72.

The pressure vessel 72 and the interlock 74 may be evacuated by means of their respective vacuum lines 102 and 104 which are connected to the main vacuum line 37. Respective control valves 106 and 108 are interposed in the vacuum lines 102 and 104 to permit control of the evacuation of the respective chambers. The chambers 72 and 74 may be back filled with ultra pure helium by means of a helium supply line 110, connected to a suitable source of helium under pressure, the introduction of which is controlled by suitable valves, not shown.

The comminuting chamber pressure vessel 72 houses a comminuting means indicated generally at 112 a portion of which is positioned externally of the pressure vessel 72 but nevertheless is a functional part of the comminuting means 112, as will become clear as the discussion proceeds. The comminuting means 112 includes a comminuting mill indicated generally at 114 powered by an electric motor 116 provided with an interconnecting multiple V-belt drive 118, or the like, and a cyclone separator or fluidizing-gas return means indicated generally at 120 which basically includes a cyclone separator main chamber 122 and a helium gas return line 124 which coacts with the comminuting mill 114 in a particular manner to be described.

The degreased, dried chips held within the conical hopper 46 are introduced into the comminuting chamber means 70 through a suitable conduit 126 which has a rotary trap chamber valve means indicated generally at 128 interposed therein. The rotary valve means 128 includes a relay operated driven motor 130 having an elongated shaft 132 provided with a plurality of vanes 134 which coact with conduit 126 to form a plurality of rotary trap chambers to permit controlled feeding of the degreased, dried chips from the conical hopper 46 into the inlet 136 of the comminuting mill 114 as seen best in FIGURE 5. The comminuting means 112 is supported within the pressure vessel 72 by means of a suitable metal framework such as a portion which is illustrated at 138.

Figure 6:
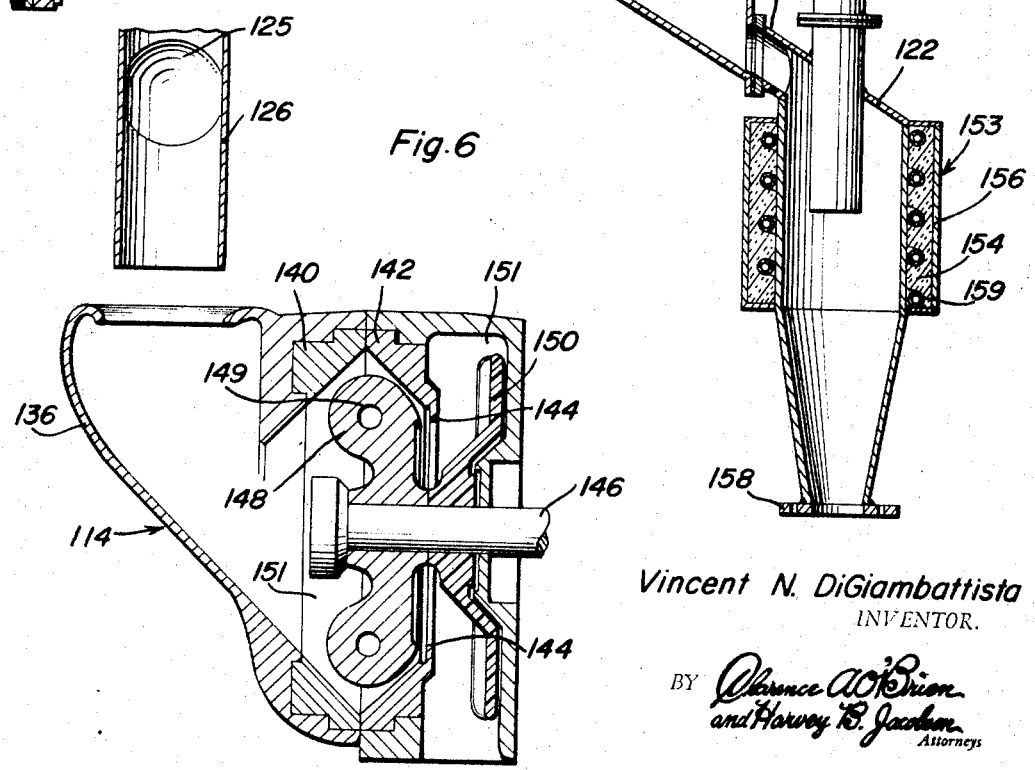
FIGURE 6 is an enlarged fragmentary vertical sectional view of a portion of the comminuting mill of FIGURE 5 taken substantially along the plane of the line 6—6 of FIGURE 5.

Referring now to FIGURE 6 it may be seen that the comminuting mill 114 includes an inlet 136 the rearwardly extending walls of which define a housing for a plurality of annular impact rings 140 and 142 which coact to form a U-shaped outwardly converging angular chamber, the rearmost of which, namely ring 142 has a flow controlling annular aperture therein as indicated at 144. The comminuting mill 114 also includes a rotatably journalled main shaft 146 provided with an impeller 148 and a fan 150 which are splined to the shaft 146 for high speed rotation therewith. Although not shown the impeller 148 is preferably provided with six axially extending vanes equidistantly and radially spaced about the impeller. As will be described in detail hereinafter, material to be comminuted enters the inlet 136 of the comminuting mill 114 where it is acted upon in a fluidized-solid condition in the chamber 151, thence drawn into the chamber surrounding the fan 150 and subsequently discharged from the fan chamber into the top of the cyclone separator 150.

Figure 5:
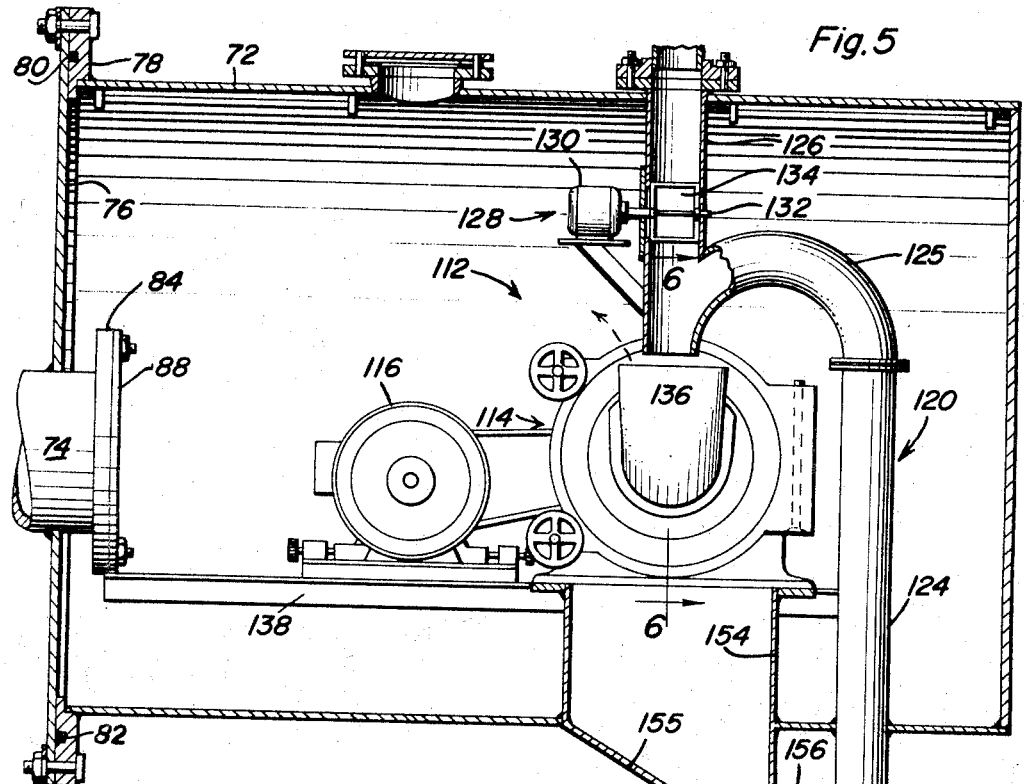
FIGURE 5 is an enlarged vertical sectioonal view of an intermediate portion of the apparatus of FIGURE 1 wherein portions of the interior are shown in elevation.

As seen best in FIGURES 5 and 6 the fan chamber 122 communicates directly with a conduit 154 provided with a downwardly sloping lower wall 155. A suitable aperture is provided in the lower portion of the conduit 154 to provide a means for connecting the conduit 154 to the inlet 156 of the cyclone 122. Although not shown, the inlet 156 of the cyclone 122 is secured to a suitable flange provided on the conduit 154 in a manner similar to the sealed interconnection of the various other components of the apparatus. A gas return line 124, as seen best in FIGURE 5 is rigidly secured in a suitable aperture in the upper wall of the cyclone 122 with the lower end of the return pipe 124 extending downwardly into the main chamber of the cyclone 122. The gas return conduit 124 extends upwardly therefrom and is provided with an arcuate upper portion 125 which connects into the lower portion of the conduit 126 to permit re-cycling of the gas from the cyclone 122 into the inlet 136 of the comminuting mill 114. The re-cycling of the helium gas into the inlet 136 of the mill 114 is critical to the process and will be described in detail later.

The cyclone 122 is further provided with a cooling means indicated generally at 153 which includes a helically arranged cooling coil 159 through which is pumped a cooling fluid such as brine, or glycol for example. The coil 159 is covered by suitable insulating material 154, which is protected and supported by an outer sheet metal shell 156. The downwardly converging walls of the cyclone 122 terminate in an integral coupling flange 158 which is sealingly clamped to a flange 160 provided on a conduit 162 which interconnects the bottom of the cyclone 122 with a comminuted material collection chamber 164 which is provided for the collection of the finely comminuted metal powder dropping from the bottom of the cyclone 122. The bottom of the collection chamber 164 is sealed off by a closure plate 166 which is secured to an integral flange 168 provided on the downwardly opening lower portion of the collection chamber 164. The plate 166 is provided with a handle 170 and is secured to the flange 168 by a plurality of fasteners in the periphery thereof such as at 172.

The collection chamber 164 is housed within a particle grading and packaging chamber means 200.

The particle grading and packaging chamber means 200 includes a generally cylindrical pressure vessel 202 having an integral rear wall 204 provided with a conduit 206 which is connected to the main vacuum line 37 to facilitate evacuation of the interior of the vessel 202. As seen in FIGURE 1, the vacuum line 206 is provided with a vacuum valve 208 of suitable construction. The front of the pressure vessel 202 is provided with a radially extending flange 210 secured to the vessel 202 by means of welding for example. The flange 210 is provided with an annular groove 212 on its outwardly facing axial surface which is provided with an O-ring seal 214. A cover plate 216 is provided to sealingly close the forward end of the pressure vessel 202 and is provided with a plurality of apertures adjacent its outer periphery which are aligned with suitable apertures in the outer periphery of the flange 210 for the reception of fastening means such as a plurality of bolts one of which is indicated at 218.

To facilitate handling of the massive closure plate 216 when it is desirable to open the front of the pressure vessel, there is provided a track 220 which is integral with and cantilevered from the upper portion of the collection vessel 202 and a trolley 222 integrally secured to the closure plate 216.

The interior of the particle grading and packing chamber means 200 is maintained under conditions similar to the conditions maintained in the various chambers described heretofore. Accordingly, the closure plate 216 is not normally opened to introduce, or remove material from the interior of the pressure vessel 202.

Figure 8:
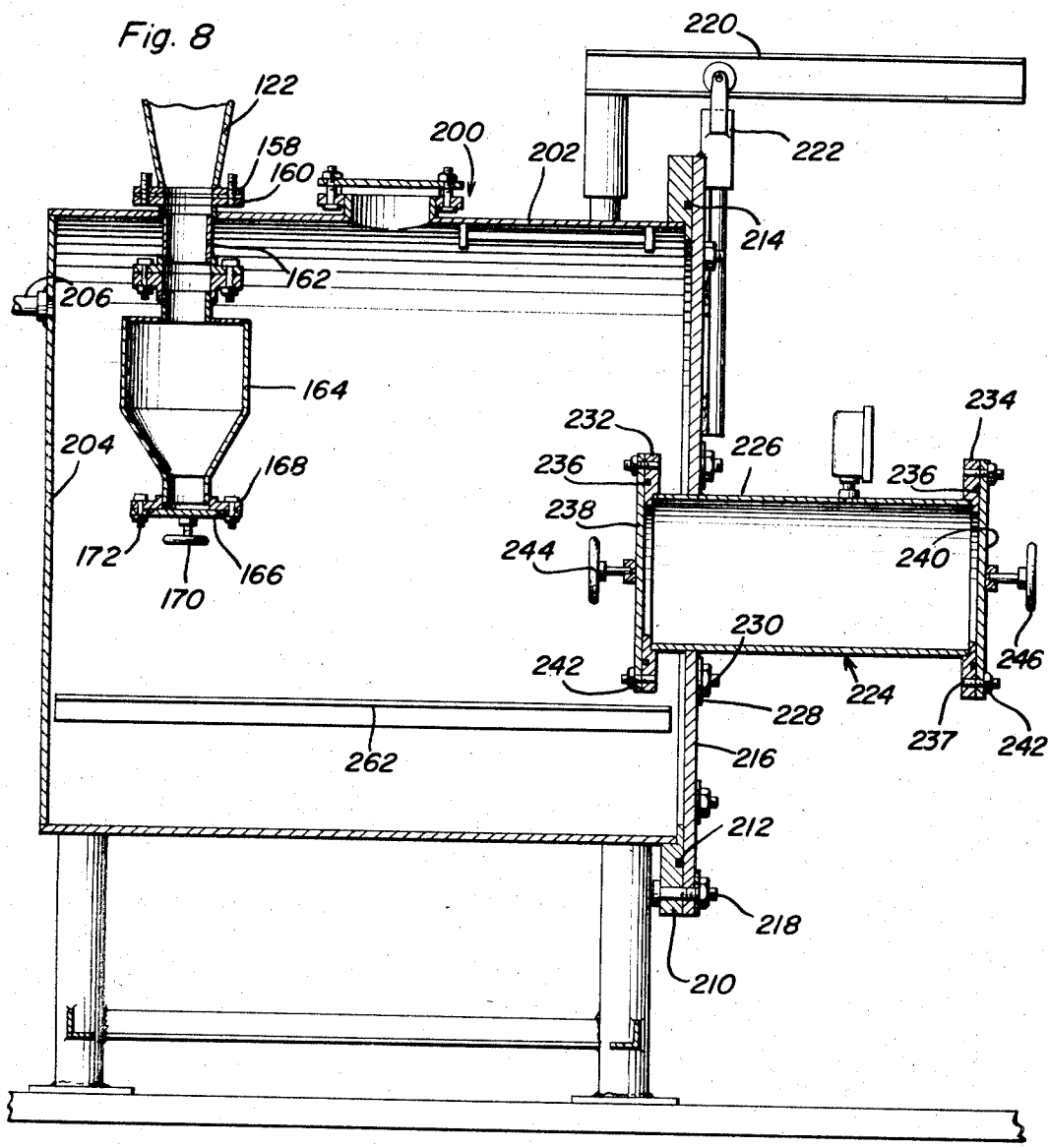
FIGURE 8 is an enlarged vertical sectional view of the lowermost portion of the apparatus of FIGURE 1 showing certain details in side elevation.

Therefore, the chamber means 200 is provided with a grading chamber interlock means 224 which comprises a generally cylindrical tube 226 integrally secured to the closure plate 216 by means of a radially extending flange 228 which is sealingly secured to the closure plate 216 by means of a plurality of suitable fasteners such as at 230. As seen best in FIGURE 8 the interlock means 24 is further provided with a pair of radially extending integral flanges 232 and 234. The flanges 232 and 234 are provided with suitable annular grooves in their outwardly facing axial surfaces for the reception of O-ring seals 236. A pair of closing plates 238 and 240 are removably secured to their respective radial flanges 232 and 234 by means of a plurality of threaded studs integrally secured to the radial flanges and passing through suitable apertures provided in the respective plates 238 and 240 adjacent their peripheral edges. The plates 238 and 240 are thus removably secured in sealed relationship to the flanges 232 and 234 by a plurality of nuts such as at 242 which are threadably received on the studs 237. The closure plates 238 and 240 are further provided with respective handles 244 and 246 to facilitate manipulation of the cover plates when utilizing the interlock means 224 to introduce material into or remove material from the particle grading and packaging chamber means 200.

As seen best in FIGURE 1 the interlock means 224 is further provided with a vacuum line 248 which connects with the vacuum line 206 of the pressure vessel 202 and is thus connected to the main vacuum line 37. The vacuum line 248 has interposed therein a vacuum valve 250 of suitable construction. The particle grading and packaging chamber means 200 and the interlock means 224 may be back filled with ultra pure helium subsequent to evacuation, by virtue of the fact that they are provided with supply lines 252 and 254 respectively, which are connected to a source of ultra pure helium under pressure. Although not shown, it will be understood that the lines 252 and 254 are provided with suitable valves for the control of the flow of the helium.

The chamber means 200 is further provided with a plurality of inspection or sight ports 256 which are similar in construction to the inspection ports 41 previously described. In addition, the means 200 is also provided with a plurality of glove ports 258 analogous in construction and operation to the glove ports 98 previously described.

Due to the fact that it is critical to the practice of this invention to maintain a substantially inert atmosphere within the various components comprising the processing apparatus it will be understood that each and every removably secured joint, or cover plate described heretofore will be provided with means to sealingly secure the respective elements thereby substantially precluding the contamination of the interior of the process equipment by any gaseous or finely divided particulate contaminants. In addition, although not specifically mentioned heretofore, wherever possible the process equipment will be fabricated from relatively inert materials such as suitable stainless steel alloys, or the like.

Referring to FIGURE 1, a central control panel is indicated generally at 260. With the panel 260 are integrated the various relays necessary for the remote control of the chip feeding means 128, comminuting means 114, vacuum pump, heating and cooling controls, temperature and pressure sensing instruments and recorders, and the like. In addition, although not shown, various other components of the apparatus such as the vacuum valves 50, 60 and the other various valves such as valves 54, 108, 106, 208 and 250 for example, could be solenoid controlled from the control panel means 260.

Briefly referring to the operation of the various components of the apparatus in carrying out the process of the present invention, the previously degreased washed generally dried zirconium alloy chips, or the like, are introduced into the drying oven means 20 where they are completely dried. The dried chips are then transferred by gravity to the conical hopper 46 from which they are metered by the chip feed means 128 into the inlet 136 of the comminuting means 114 housed within the comminuting chamber means 70 from which they are discharged into the cyclone separator 122 from which they drop by gravity into the collection chamber 164 housed within the particle grading and packaging chamber means 200.

It will be understood, of course that the process equipment is evacuated and back filled with ultrapure helium to a slightly superatmospheric pressure to provide a substantially inert atmosphere surrounding the metal chips being comminuted.

Referring now specifically to the operation of the process equipment in carrying out the process of the present invention for the comminution of metal chips derived from ductile elemental metals or alloys thereof such as zirconium, beryllium, copper, lead, gold, silver and the like the comminuting chamber means 70 and its associated interlock 74 and cyclone separator 122 as well as the particle grading chamber means 200 and its associated interlock means 224 are evacuated, or pumped down to a pressure of approximately 10 microns, by means of a suitable vacuum pump, the inlet of which is connected to the main vacuum line 37. Upon reaching a pressure of approximately 10 microns the respective chambers are back filled with ultra pure helium to a positive pressure of approximately 2 ounces above the ambient pressure surrounding the process equipment thereby substantially precluding the contamination of the interior of the process equipment by leakage of contaminants from the exterior inwardly should minute leaks develop, inasmuch as many of the metals being processed, and particularly zirconium may be readily ignited when in a finely particulate state when oxidizing gases are present. In addition, oxygen and nitrogen contaminants for example, may be picked up by the material being comminuted thereby rendering the material unsuitable for the purpose intended.

The previously degreased detergent washed partially dried zirconium chips, or the like, are then introduced into the vacuum drying means 20 through the open top thereof. The closure member 34 is then sealingly secured thereby isolating the interior of the drying oven 20. The interior of the oven is pumped down to a pressure of approximately 10 microns by means of the vacuum line 38, connected to the main vacuum line 37. The interior of the drying oven 20 is then back filled with ultra pure helium through the conduit 40 after which the electrical resistance strip heaters 28 are energized to heat the interior of the oven 20 to an operating temperature of appoximately 250° F. to remove all traces of moisture from the metal chips.

It will be understood of course that during the drying of the metallic chips it may be necessary to maintain a flow of helium to the interior of the oven 20 in order to maintain a positive pressure within the oven 20 as the moisture laden fluid is being evacuated through the vacuum line 38 thus assuring that the chamber remains slightly above the surrounding ambient pressure to substantially preclude contamination of the metal chops 48 during the drying thereof. When an analysis of the effluent discharging through line 38 indicates that the chips are thoroughly dried the vacuum valve 50 in the discharge tube 26 of the oven 20 is opened to permit the metallic chips 48 to drop under the influence of gravity into the conical hopper 46 which has of course been evacuated and back filled with ultra pure helium.

The drive motor 116 for the comminuting means 114 is then energized to bring the impeller 148 and fan 150 up to speed. Referring to FIGURE 5 it will be noted that the impeller 148 and the fan 150 rotate in a clockwise fashion as indicated by the arcuate arrow. A cooling medium is then circulated through the cooling coil 159 to pre-cool the cyclone separator 122 as well as the interior of the comminuting chamber means 70 by virtue of the fact that the inlet 136 of the comminuting means 114 draws fluid from above the return line 125 and the interior of the pressure vessel 72 and discharges the same downwardly through the discharge outlet of the fan chamber 152, the conduits 154 and 156, and into the interior of the cyclone separator 122.

The helium displaced or circulated by the comminuting mill 114 is approximately 475 to 500 cubic feet per minute. Accordingly, it is possible to effectively cool the entire comminuting chamber means 70 and the apparatus contained therein by virtue of the substantial volume of cooled helium which is being circulated through the heat exchange portion 159 of the cyclone separator 122.

In addition, the specific configuration of the impeller 148, and apertures 149 in the impeller vanes 148, annular aperture 144 and fan 150 as shown in detail in FIGURE 6 cooperates to establish certain pressure differentials at the inlet 136 of the comminuting means 114. The establishment of a pressure differential is critical to the efficient comminution of ductile materials such as zirconium alloy chips for example. Specifically referring now to FIGURES 5 and 6 a vacuum pressure will exist on the right hand portion of the inlet 136 of the comminuting means 114 as seen in FIGURE 5 by virtue of the clockwise rotation of the shaft 146. However, the high velocity gas passing through the holes 149 in the vanes of the impeller 148 undergo a sudden pressure expansion thereby establishing a tendency for a portion of the helium gas to blow back out of the inlet 136 on the left hand side thereof as shown by the broken line arrow in FIGURE 5. Although we do not wish to be limited by this analysis it is theorized that this pressure differential assists in levitating the zirconium particles or the like, for a fraction of a second so that they actually fractionate one another thereby precluding a comminuting action by virtue of the particles impacting against the rings 140 and 142 which would in fact actually cause the material to gall up thereby causing the impeller 148 to seize and stall the drive motor 116.

The chip feed means 128 is then actuated to meter clean dry chips from the conical hopper 46 into the inlet 136 of the comminuting means 114 where they are acted upon in a manner described above to fractionate one another into particles of approximately 200 mesh Tyler Standard. The fractionation or attrition of the metal chips takes place in the impeller chamber 150 and the ultimate particle size of the comminuted metal powder is primarily determined by the rotational speed of the impeller 148, the annular gap between the impeller 148 and the V-shaped annular chamber provided by the rings 140 and 142, the size of the chip introduced into the inlet 136, the diameter of the annular restriction 144 and the cubic foot displacement of the gas moved by the fan 150.

The finely comminuted metal discharges from the fan chamber 152 downwardly through the conduit 154 where it is directed into the cyclone 122 by the sloping wall 155 through the conduit 156. The metal particles then swirl helically and downwardly due to the influence of gravity and centrifugal force and the carrier gas, namely the ultra pure helium, returns to the inlet 126 of the comminuting means 114 through the pipes 124 and 125 by virtue of a negative pressure differential established by the rotation of the impeller 148 and the fan 150.

In practice, substantially none of the comminuted material is re-cycled with the inert fluidizing carrier gas through the conduits 124 and 125. Occasionally, there is an infinitestimally small return of particles which average less than 1 micron in size.

From the foregoing it will be apparent that a quasi fluidized-solid condition must be maintained within the impeller chamber 148 of the comminuting means 114 to permit efficient comminution of a ductile metal or metal alloy such as zirconium or zirconium alloy for example.

Referring once against to FIGURE 1 and the function and operation of the interlocks 74 and 224 and the glove ports 98 and 258 it will now be appreciated that the interior of the process equipment must be isolated from the ambient atmosphere during the processing of metal chips. Accordingly, when it is desirable to introduce material into the interior of the process equipment it must first be placed in the interlock of the respective chamber. Once inside the interlock the interior of the interlock is evacuated through its respective vacuum line 104, or 248 and then back filled with ultra pure helium through the respective helium lines 110 or 254. Then, the necessary glove port cover plates 99 may be removed and the operator's hands inserted into the glove which project inwardly into the process chamber. The inner closure plate of the interlock namely 88 or 238 may then be removed and the material moved from within the interlock into the main chamber. The closure plate is then replaced in position on its respective interlock.

Conversely when it is desirous to move material from the interior of the process chamber such as chamber 70 or 200 to the exterior, the interlock is evacuated and back filled with helium after which the respective closure plate is removed and the material passed into the interlock. The interior closure plate is then resealed and the exterior closure plate opened to permit removal of the material from the interlock without effecting the atmosphere within the process chamber.

Inasmuch as the grading of the metal powder collected in the collection chamber 164 must be done in a substantially inert atmosphere the glove ports 258 on the chamber means 200 are utilized to withdraw the material from the collection chamber 164 onto a magnetic separator, of conventional design not shown, which is utilized to separate out any ferrous particles which may be present in the metal powder. The non-ferrous powder is then placed in Tyler Standard sieves which are provided with a vibrating means, of conventional design not shown to effect a grading of the metal particles according to the particle size required. The sized particles are then hermetically sealed in suitable containers and are then ready to pass through the interlock means 224 in the manner described supra in order to prevent contamination of the interior of the particle grading and packaging chamber means 200. The separating, grading and packaging may for example be conducted on a planar surface such as that provided by the planar member 262.

Accordingly, it may be seen that there has been provided suitable apparatus for and a process of producing metal powder from ductile metals or alloys thereof which results in a metal powder possessing the chemical and physical parameters required for powders such as zirconium alloy powders utilized for the fabrication of atomic reactor components as well as for the production of metal powders from other metals such as copper, lead, gold, silver and beryllium for example.

This invention and the manner of making and using it is herein described in full, clear, concise and exact terms so that those skilled in the art may make and use it. Its principal and preferred mode of application have been explained. However, it is intended that this invention invention includes all modifications and embodiments within the spirit and scope of the appended claims.

What is claimed as new is as follows:

1. In combination an apparatus for the production of finely powdered high purity powdered metal from relatively ductile metal and ductile metal alloy chips in a substantially inert atmosphere comprising:
    (a) a vacuum oven means adapted to dry said metal chips,
    (b) a hopper means operatively associated with said vacuum oven means and adapted to receive dried chips from said oven,
    (c) a metal chip comminuting means adapted to receive dried metal chips from said hopper and adapted to comminute said chips into powder while suspending said powder in an inert fluidizing carrier gas to substantially preclude galling of said particles,
    (d) a means operatively associated with said comminuting means to separate said metal powder from said inert carrier gas and recycle said carrier gas for reuse in said comminuting means, and
    (e) means adapted to permit particle size grading and hermetic packaging of said comminuted metal while maintaining said metal powder in an inert atmosphere.

2. In combination an apparatus for the production of finely powdered high purity powdered metal from relatively ductile metal and ductile metal alloy chips in a substantially inert atmosphere comprising:
    (a) a vacuum oven means adapted to dry said metal chips,
    (b) a hopper means operatively associated with said vacuum means and adapted to receive dried chips from said oven,
    (c) a metal chip comminuting means adapted to receive dried metal chips from said hopper and adapted to comminute said chips into powder while suspending said powder in an inert fluidizing carrier gas to substantially preclude galling of said particles,
    (d) a means operatively associated with said comminuting means to separate said metal powder from said inert carrier gas and recycle said carrier gas for reuse in said comminuting means,
    (e) means for cooling said separating means to remove heat from the material discharging into said separator from said comminuting means thereby precooling the carrier gas being recycled, and
    (f) means adapted to permit particle size grading and hermetic packaging of said comminuted metal while maintaining said metal powder in an inert atmosphere 3. The combination of claim 2 including:
    (g) interlock means operatively associated with the comminuting means and said grading means whereby material may be passed in and out of said comminuting and grading means without contaminating said substantially inert atmosphere within said apparatus.

4. The combination of claim 3 including:
    (h) means operatively associated with said vacuum oven means, said hopper means, said comminuting means, and said particle grading means to evacuate the air from said means, and
    (i) means operatively associated with said vacuum oven means, said hopper means, said comminuting means, and said particle size grading means to back fill said means with a substantially inert gas.

5. Apparatus for the production of finely powdered metal, from chips thereof, in a substantially inert gaseous atmosphere which apparatus comprises a metal chip comminuting means including:
    (a) means intaking chips and a concurrent flow of an inert gas of sufficient flow to fluidize said chips,
    (b) comminuting chamber means for attriting said chips into finely powdered metal by attriting said chips against one another while substantially precluding impacting of said chips against the surfaces of said comminuting chamber means,
    (c) said comminuting chamber means including an impeller means mounted for high speed rotation and including a plurality of radially disposed axially extending impeller blades each provided with an aperture therethrough normally creating a back pressure on said inert gas to assist in precluding impacting of said chips and metal powder against the surfaces of said comminuting chamber means, and
    (d) means for discharging finely powdered metal from said comminuting chamber means for subsequent separation from the inert gas and separate recovery of the metal powders.

6. The method of producing finely powdered high purity powdered metal from relatively ductile metal and ductile metal alloy chips in a substantially inert atmosphere which includes the steps of:
    (a) degreasing and washing the chips to be comminuted in a non-contaminating solvent solution,
    (b) drying said washed chips to remove surface moisture,
    (c) charging said partially dried chips into a vacuum drying oven and thoroughly drying said chips in the presence of a substantially inert gas,
    (d) selectively feeding said dried chips into a comminuting mill while maintaining said chips in a substantially inert atmosphere,
    (e) comminutinng said dried chips while spending said chips in a flow of a substantially inert carrier gas whereby said material being comminuted is levitated for a period of time sufficient to substantially preclude the galling and agglomeration of the material being comminuted,
    (f) separating the comminuted material from the carrier gas, while maintaining said collected material in a substantially inert atmosphere cooling and recycling the carrier gas for reuse in the comminuting steps, whereby said cooling of said carrier gas is utilized to control the temperature of the material being comminuted,
    (g) grading and hermettically packaging the comminuted material, while maintaining said comminuted material in a substantially inert atmosphere, to preclude contamination of said comminuted material, and
    (h) selectively removing the hermetically packaged material from the inert processing atmosphere without contaminating the inert processing atmosphere.

7. The method of producing finely powdered high purity powdered metal from relatively ductile zirconium and zirconium metal alloy chips which includes the steps of:
    (a) comminuting said chips by mutual attrition while suspending said chips in a flow of a substantially inert carrier gas whereby said material being comminuted is levitated for a period of time sufficient to substantially preclude the galling and agglomeration of the material being comminuted,
    (b) separating the comminuted material from the carrier gas, while maintaining said collected material in a substantially inert atmosphere, (c) cooling and recycling the carrier gas for reuse in the comminuting step, said cooling of said carrier gas controlling the temperature of the material being comminuted, and (d) packaging the comminuted material, while maintaining said comminuted material in a substantially inert atmosphere at a pressure in excess of the ambient pressure, to preclude contamination and oxidative degradation of said comminuted material.

References Cited

UNITED STATES PATENTS

| | | | |
|---|---|---|---|
| 1,917,525 | 7/1933 | Jensen | 241—195 |
| 1,931,555 | 10/1933 | Mosley | 241—284 X |
| 1,954,175 | 4/1934 | Jensen | 241—195 |
| 2,112,333 | 3/1938 | Crew | 241—18 X |
| 2,602,597 | 7/1952 | Ball | 241—195 |
| 2,624,460 | 1/1953 | Parten | 241—56 X |
| 2,626,930 | 1/1953 | Savage | 241—18 X |
| 3,037,712 | 6/1962 | Hosokawa et al. | 241—56 |
| 2,208,919 | 7/1940 | Winter et al. | |
| 2,400,382 | 5/1946 | Arnold | 241—48 X |

ANDREW R. JUHASZ, *Primary Examiner.*

FRANK T. YOST, *Assistant Examiner.*

U.S. Cl. X.R.

241—17, 24, 48, 65, 79.1, 100